(12) United States Patent
Sawamoto

(10) Patent No.: US 6,517,154 B2
(45) Date of Patent: Feb. 11, 2003

(54) SHOCK-REDUCING RESTRAINT

(75) Inventor: Yoshinobu Sawamoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/778,037

(22) Filed: Feb. 7, 2001

(65) Prior Publication Data

US 2002/0043830 A1 Apr. 18, 2002

Related U.S. Application Data

(60) Provisional application No. 60/181,089, filed on Feb. 8, 2000.

(51) Int. Cl.[7] .............................. A47C 1/08; A47D 1/10; B60N 2/42; B60R 21/02
(52) U.S. Cl. .................. 297/216.11; 297/254; 296/68.1
(58) Field of Search ............................ 297/216.11, 254; 296/68.1, 64

(56) References Cited

U.S. PATENT DOCUMENTS

| | | | | |
|---|---|---|---|---|
| 4,099,770 A | * | 7/1978 | Elsholz et al. | ......... 297/216.11 |
| 5,383,707 A | | 1/1995 | Osenkowski et al. | ....... 297/238 |
| 5,685,603 A | * | 11/1997 | Lane, Jr. | ................. 297/216.11 |
| 5,695,243 A | * | 12/1997 | Anthony et al. | .... 297/216.11 X |
| 5,941,600 A | * | 8/1999 | Mar et al. | ................ 297/254 X |
| 6,095,604 A | * | 8/2000 | Stack et al. | .................. 297/254 |
| 6,267,441 B1 | * | 7/2001 | Otero | ........................... 297/254 |
| 6,267,442 B1 | * | 7/2001 | Shiino et al. | ................ 297/254 |

FOREIGN PATENT DOCUMENTS

EP  0 841 209  5/1998

* cited by examiner

Primary Examiner—Rodney B. White
(74) Attorney, Agent, or Firm—Foley & Lardner

(57) ABSTRACT

A yieldable restraint for the upper portion of the child seat for reducing the shock applied to the person sitting on the child seat by restraining equipment in case of a frontal crash. The restraint has an extensive energy-absorbing device in the member connected to the upper portion of the child seat by the tether belt. In case where a large turning force in the forward direction is applied to the child seat mounted on the seat and the connecting member is pulled forward by a force in excess of a prescribed value, the energy-absorbing device extends while absorbing a stress generated by the turning force. The energy-absorbing device may have a stress absorbing groove with crushable portions. Alternatively, a tear seam can be provided on the tether belt wherein the stress is absorbed by the tear seam being torn. Further, the tether belt can be woven so as to elongate while absorbing the stress.

15 Claims, 6 Drawing Sheets

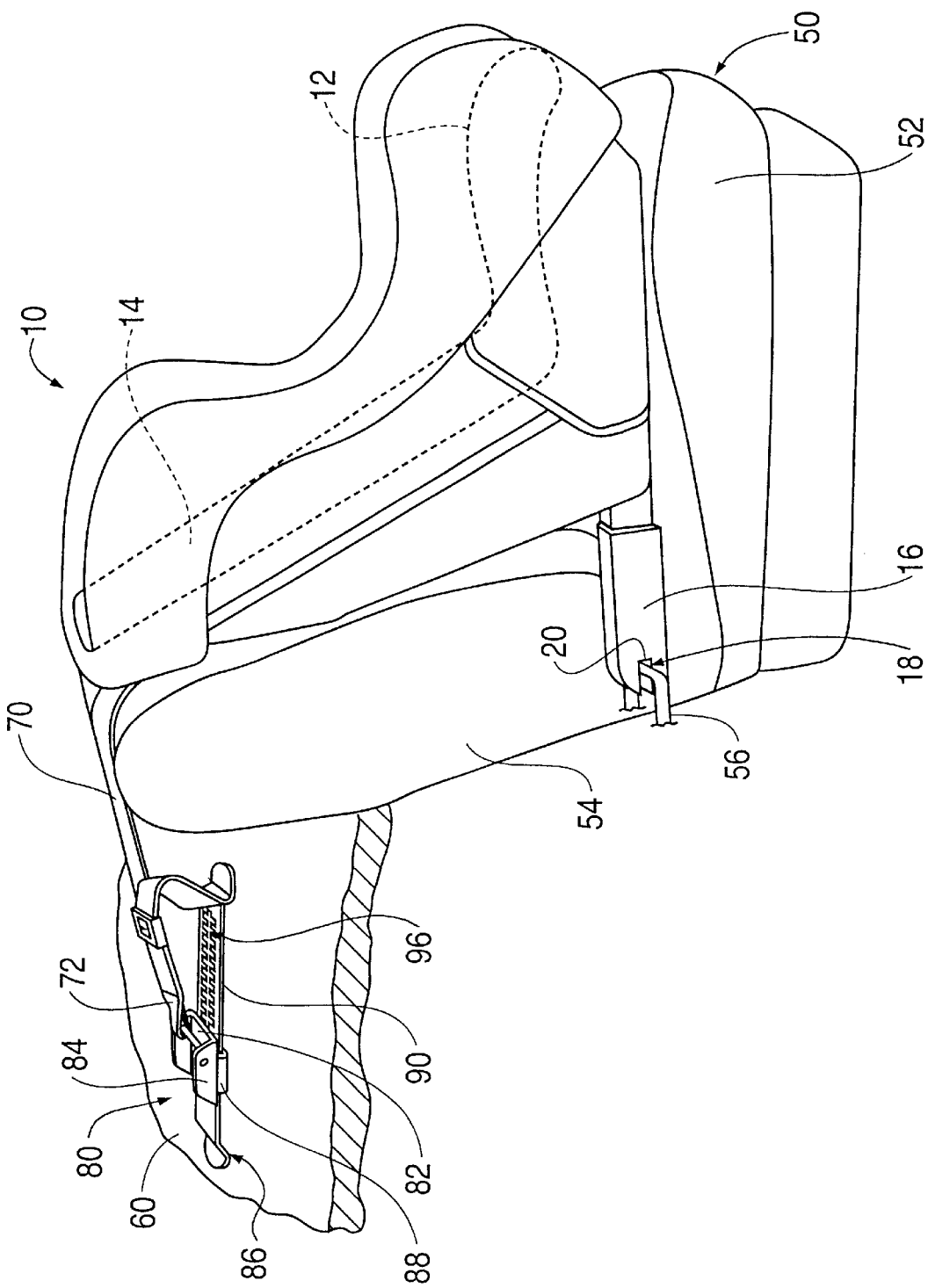

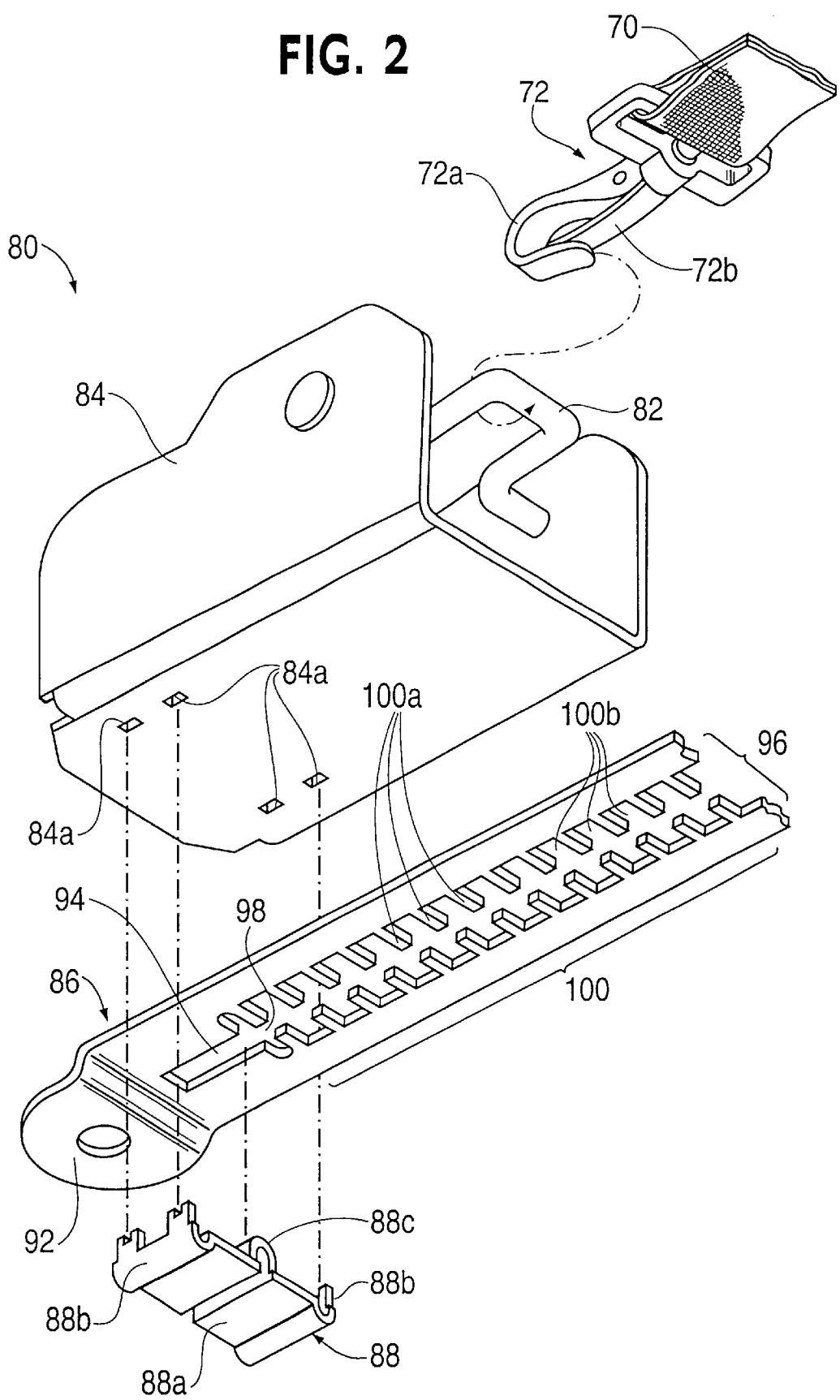

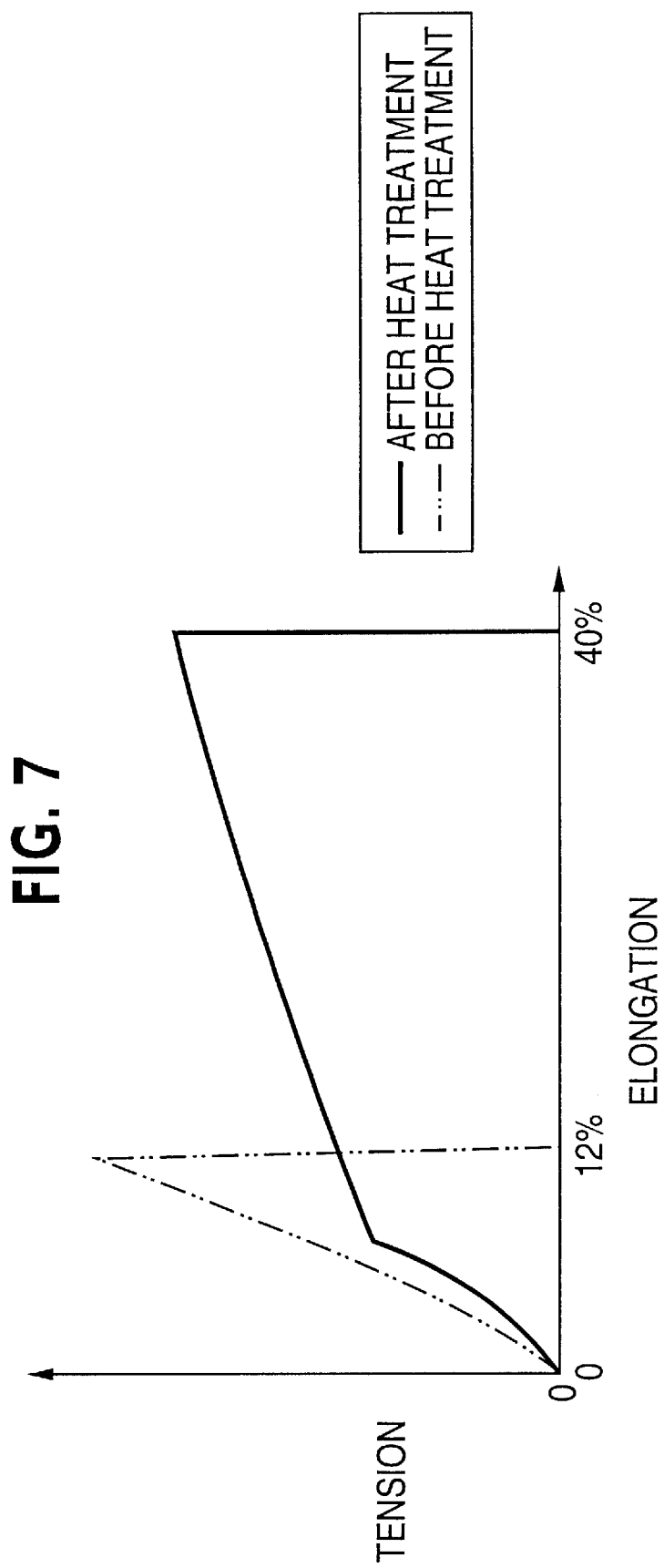

SHOCK-REDUCING RESTRAINT

CROSS REFERENCE TO RELATED APPLICATIONS

This application claims priority to and the benefit of U.S. Provisional Application Ser. No. 60/181,089, filed Feb. 8, 2000, the disclosure of which is hereby incorporated by reference herein in its entirety.

BACKGROUND OF THE INVENTION

The present invention relates restraining of devices and, more particularly, to an apparatus for restraining the upper portion of a child seat that has been itself mounted on the seat of an automobile or other vehicle. More specifically, the invention relates to an apparatus for yieldably restraining the upper portion of a child seat such that the shock applied to the occupant of the child seat in the event of a crash or the like is reduced.

A child seat comprises a sitting portion on which the buttocks of the infant or child rest and a back portion against which the back of the infant or child leans. The sitting portion and the back portion are typically unitarily formed therewith. The occupant of the child seat is restrained by restraining equipment (such as a seat belt for children) provided on the child seat.

The typical child seat is itself fixed to the vehicle seat by an adult seat belt. When fixing the child seat on the seat with an adult seat belt, the necessary procedures of pulling the seat belt and passing it through or hooking on the prescribed portions of the child seat can be troublesome. In addition, it expends much effort to carry a child seat into the cabin of the vehicle because the child seat is bulky.

European Patent Application No. EP 841209 A1 discloses a system in which bearing seats formed of rods are mounted on the left and right sides of the seat of the automotive vehicle so that a child seat is detachably mounted on the rear. The child seat of this type comprises two longitudinal members extending rearward, and the tips of the longitudinal members are provided with engaging portions to be engaged with the bearing seats. The left and right sides of the child seat are provided with arms being rotatable in the back and forth directions, so that the isolation of the child seat from the vehicle seat is prevented by the abutment of the arms against the seat back of the vehicle seat.

In case of a frontal crash (including an offset crash, same applies hereinafter) of the vehicle, a large force in the forward direction is applied to the child seat being mounted forward-facing on the vehicle. With the lower part of the child seat fixedly restrained to the seat, a frontal crash generates a rotational force causing the child seat to turn forward, so that the upper portion of the child seat inclines forward.

To prevent the rotational movement of the upper portion of the seat, one possibility may be to connect the upper portion of the child seat to a vehicle member located behind the seat. However, when the upper portion of the child seat is connected to the vehicle member, the shock applied by the child seat restraining equipment (webbing for children or the like) to the child seat occupant may increase in case of a frontal crash.

Accordingly, an object of the present invention is to provide an apparatus for restraining the upper portion of the child seat that can reduce the shock applied to the child seat occupant.

SUMMARY OF THE INVENTION

A child seat restraining apparatus of the present invention has an extensible energy-absorbing device that is intended for yieldably supporting the upper portion of the child seat that is mounted facing forwardly on the seat of the high speed mobile body and attached to a fixed body portion behind the child seat. When a forward stress in excess of a prescribed value is applied to the child seat, the device increases the distance between the upper portion of the child seat and the fixed body while absorbing the stress.

In such a child seat restraining apparatus, when a stress in excess of a prescribed value is applied, the upper portion of the child seat moves forward while the apparatus absorbs the stress, so that a shock applied by child seat restraining equipment to the person sitting on the child seat decreases.

As to a general aspect of the invention, the apparatus comprises an extensible energy-absorbing device having a movable portion adapted to increase the effective length of the device upon application of a tensile stress in excess of a prescribed value to the device, a seat-engaging element operatively connected to one of the movable portion of the energy-absorbing device and adapted for attachment to the upper portion of the child seat, and a vehicle-engaging element operatively connected to the movable portion of the energy-absorbing device and adapted for attachment to the fixed body portion of the vehicle.

As a mechanism for absorbing the shock, the energy-absorbing device may take the form of, e.g., a metal member that absorbs the stress by becoming deformed by the stress, a tether belt having tear seam, or a tether belt woven so as to be stretched while absorbing a stress.

When a metal member is used, variation in the breaking strength of metal is not significant, and it is relatively simple to set the stress absorption strength.

When a tether belt is used, a stress absorbing means may be provided directly on the tether belt. If so provided, it is not necessary to provide an additional stress absorbing device, thereby decreasing the number of components. It is also possible to use a conventional tether belt combined with a stress-absorbing feature.

When using a tether belt woven so as to be stretched while absorbing a stress, a stress absorbing feature may be provided by changing the weave of the tether belt itself. If so provided, it can be used as a specific tether belt for absorbing the stress, thereby reducing the number of the components. Time and effort in providing a tear seam can be saved.

BRIEF DESCRIPTION OF THE DRAWINGS

FIG. 1 is a side view of the child seat of the vehicle comprising a child seat restraining apparatus according to the first embodiment.

FIG. 2 is an exploded view of the child seat restraining apparatus shown in FIG. 1.

FIG. 3(a) is a perspective view of the restraining apparatus before actuation of the stress absorbing mechanism viewed from the bottom side, and FIG. 3(b) is a perspective view of the restraining apparatus when the stress absorbing mechanism is actuated.

FIG. 7 is a graph illustrating the change in characteristic caused by heat treatment of the warp of the tether belt.

DETAILED DESCRIPTION OF THE PREFERRED EMBODIMENTS

Figure 3A:
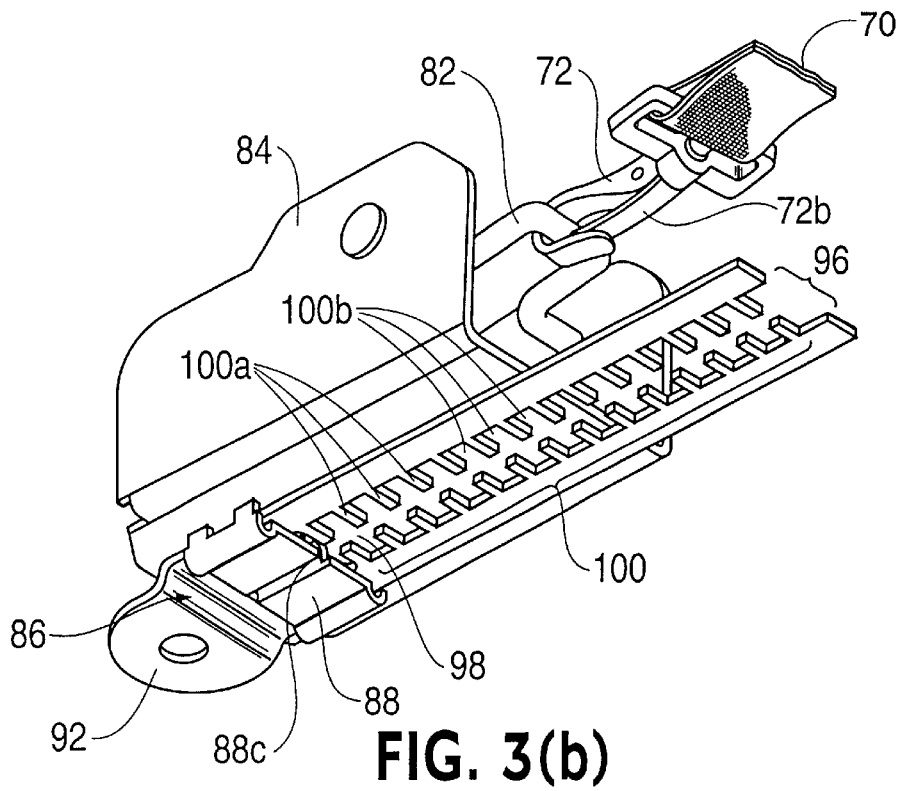
FIGS. 3(a) and 3(b) are explanatory drawings illustrating the stress absorbing mechanism of the child seat restraining apparatus shown in FIG. 2.

Referring now to the drawings, the embodiments of the present invention will be further described.

The child seat 10 is mounted forward-facing on the seat 50 of the automotive vehicle having a seat cushion 52 and a seat back 54 (in this embodiment, the seat 50 is a rear seat of the automotive vehicle). The child seat 10 comprises a sitting portion 12 on which the buttocks of the person sitting thereon such as an infant or the like rest, a back portion 14 unitarily extending from the rear end of the sitting portion 12 upwardly, and a pair of arms 16 projecting from the left and right ends of the rear portion of the sitting portion 12. On the upper portion of the child seat 10, a tether belt 70 described below is provided with one end connected thereto.

The arm 16 is provided with a clamping portion 18 for clamping the clamp bar 56 provided on the rear portion of the vehicle seat 50 on the left and right sides. The clamp bar 56 extends in the direction of the width of the vehicle. The clamping portion 18 receives the clamp bar 56 in the recess portion 20 formed on the tip of the arm 16, and clamps the clamp bar 56 by latching the clamp bar 56 coming in the recess portion 20 with a hook or the like, not shown.

The lower part of the child seat 10 mounted on the seat 50 is fixedly restrained with respect to the seat 50 by allowing the clamp bar 56 to be clamped in the clamping portion 18 formed on each arm 16.

In this embodiment, a restraint with an energy-absorbing device 80 for yieldably restraining the upper portion of the child seat 10 via a tether belt 70 is provided on the upper surface (facing toward the cabin of the vehicle) of the rear panel 60 behind the seat 50 as a fixed body portion of the vehicle. The child seat 10 is prevented from inclining forwardly by being restrained by the energy-absorbing device 80 at its upper portion.

The tether belt 70 is connected to the upper portion of the back portion 14 of the child seat 10 at one end, and a hook 72 for engaging with the bar 82 of the connecting member 84 described later is attached to the other end. The hook 72 is provided with a closing strip 72b extending between the tip portion and the root portion of the hook shaped portion 72a for closing the hook shaped portion 72a into a loop so as to prevent the bar 82 engaged with the hook shaped portion 72a from being detached (FIG. 2, FIG. 3).

The closing strip 72b is a tongue shaped resilient member fixed on the root portion of the hook shaped portion 72a at one end and abutted against the inner surface of the hook shaped portion from the halfway of the bent portion to the tip thereof at the other end in such a manner that it can be brought out of contact therewith (hereinafter, the other end is referred to as "closed end" in some cases). The hook 72 may be opened by resiliently bending the closing strip 72b by applying an external force thereto and moving the closing end away from the tip of the hook shaped portion 72a toward inside of the bent portion, so that it can be engaged with the bar 82. When the external force applied to the closing strip 72 is released after the hook shaped portion 72a is engaged with the bar 82, the closing end is moved back and abutted against the tip of the hook shaped portion 72a by the resilient force, so that the bar 82 is prevented from being detached.

The energy absorbing device 80 comprises a connecting member 84 having a bar 82 with which the hook 72 of the tether belt 70 is engaged, and a base plate 86 for holding the connecting member 84 onto the rear panel 60 of the vehicle. An anchor 88 connects the connecting member 84 and the base plate 86 with respect to each other.

The base plate 86 comprises a rail section 90 formed of an elongated band-shaped metal plate, which is disposed on the upper surface of the panel 60 so as to extend along the direction toward and away from the seat 50. The base plate 86 includes leg portions 92 on both ends of the elongated rail portion 90, each of which is fixed on the upper surface of the panel 60 by appropriate fixing means (a bolt or the like). The leg portion 92 supports the rail section 90 so that the rail section 90 extends with a prescribed distance away from the upper surface of the panel 60.

The rail section 90 comprises an engaging hole 94 to which the projecting portion 88c of the anchor 88 described later fits in the vicinity of the opposite end from the seat 50. The rail section 90 is formed with a stress absorbing groove 96 extending from the engaging hole 94 toward the seat 94.

The stress absorbing groove 96 comprises a guide groove 98 in communication with the engaging hole 94 and extending from the engaging hole 94 along the length of the rail section 90, and a comb-shaped section 100 having a projecting strips 100a and recesses 100b formed alternately along both longitudinal edges on the left and right of the guide groove 98. When a stress in excess of a prescribed value is applied in the direction toward the seat, that is, forwardly, to the projecting portion 88c fitted within the engaging hole 94, the projecting portion 88c crushes the projecting strips 100a and enters into the stress absorbing groove 96, and then moves forward in the stress absorbing groove 96 along the guide groove 98 while crushing the projecting strips 100a successively according to the stress applied. When the stress applied to the projecting portion 88c is less than the prescribed value, the projecting strips 100a stops the advance of the projecting portion 88c and prevents it from entering into the stress absorbing groove 96.

The projecting portion 88c enters into the stress absorbing groove 96 when a stress is applied in excess of a prescribed value moves in the groove 96 while crushing projecting strips 100a, and thus the stress is absorbed and the advancement of the projecting portion 88c stops when the stress is reduced to the value below the prescribed value.

The anchor 88 comprises a main plate portion 88a disposed along the under surface of the rail section 90, a pair of arm shaped strips 88b standing upright from the left and right side of the main plate portion 88a along the longitudinal edges on the left and right of the rail section 90, and a projecting portion 88c projecting upward from near the center of the main plate portion 88a and being fitted into the engaging hole 94 of the rail section 90.

The connecting member 84 is disposed on the upper surface side of the rail section 90 and connected unitarily with the anchor 88 by the engagement of the tips of the respective arm shaped strips 88b of the anchor 88 into the engaging holes 84a formed on the lower surface, and clamps the rail section 90 between the connecting member and the anchor 88 so that they cannot come apart from the rail section 90. The connecting member 84 is engaged with the portion in the vicinity of the opposite end of the rail section 90 from the seat 50 since the projecting portion 88c of the anchor 88 is fitted within the engaging hole 94 formed on the rail section 90.

The bar 82 is fixed to the connecting member 84 so as to extend in the direction of the width of the vehicle. By engaging the hook 72 of the tether belt 70 connected to the upper portion of the child seat on one end, the connecting member 84 and the upper portion of the child seat 10 mounted on the seat 50 are connected so that the energy-absorbing device 80 yieldably supports the upper portion of the child seat and prevents the child seat from turning forward.

When a strong force for turning the child seat 10 forward is generated so that the connecting member 84 is strongly pulled forward via the tether belt 70 and thus a stress in excess of a prescribed value in the forward direction is applied to the projecting portion 88c fitted within the engaging hole 94 of the rail section 90, the projecting portion 88c digs into the stress absorption groove 96 in communication with the engaging hole 94 and starts moving forward in the groove 96 while crushing the projecting strips 100a. At this time, the connecting member 84 advances along the rail section 90 integrally with the anchor 88 so that the upper portion of the child seat 10 moves away from the panel 60. Therefore, the child seat 10 moves forward while an excess of turning force applied to the upper portion is being absorbed.

Hereafter, the action of the energy-absorbing device 80 in such a structure taken in case of emergency such as a frontal crash of the vehicle will be described.

The lower portion of the child seat 10 mounted forward-facing on the rear seat 50 of the vehicle is restrained to the seat 50 by the clamping portion 18 of the arm 16 extending rearward from the sitting portion 12 engaged with the clamp bar 56 mounted at the rear portion of the seat. By engaging the hook 72 of the tether belt 70 connected to the upper portion of the back portion 14 with the bar 82 of the energy-absorbing device 80 provided on the rear panel 60 behind the seat 50, the upper portion of the child seat 10 is yieldably supported by the energy-absorbing device 80 so as not to turn forward.

The body of the person sitting on the child seat such as an infant is restrained on the child seat by restraining equipment such as a webbing for children, not shown, in the posture seated on the sitting portion 12 of the child seat 10 and leaned against the back portion 14.

In this way, in case when a crash occurs with the child seat 10 fixed on the seat 50 of the vehicle and the body of the person sitting on the seat restrained to the child seat 10 by restraining equipment, restraining equipment presses the body of the person sitting on the seat against the child seat 10 and prevents the person sitting on the seat from being thrown out of the child seat 10, and thus a large advancing force is applied to the child seat 10 connected with the restraining equipment. At this time, since the lower portion of the child seat 10 is fixedly restrained to the seat 50, a large turning force is applied suddenly to the upper portion so as to turn forward.

When the turning force is relatively small, the slidably supporting apparatus 80 slidably supports the upper portion of the child seat 10 reliably so as to prevent the child seat 10 from being turned forward.

Figure 3B:
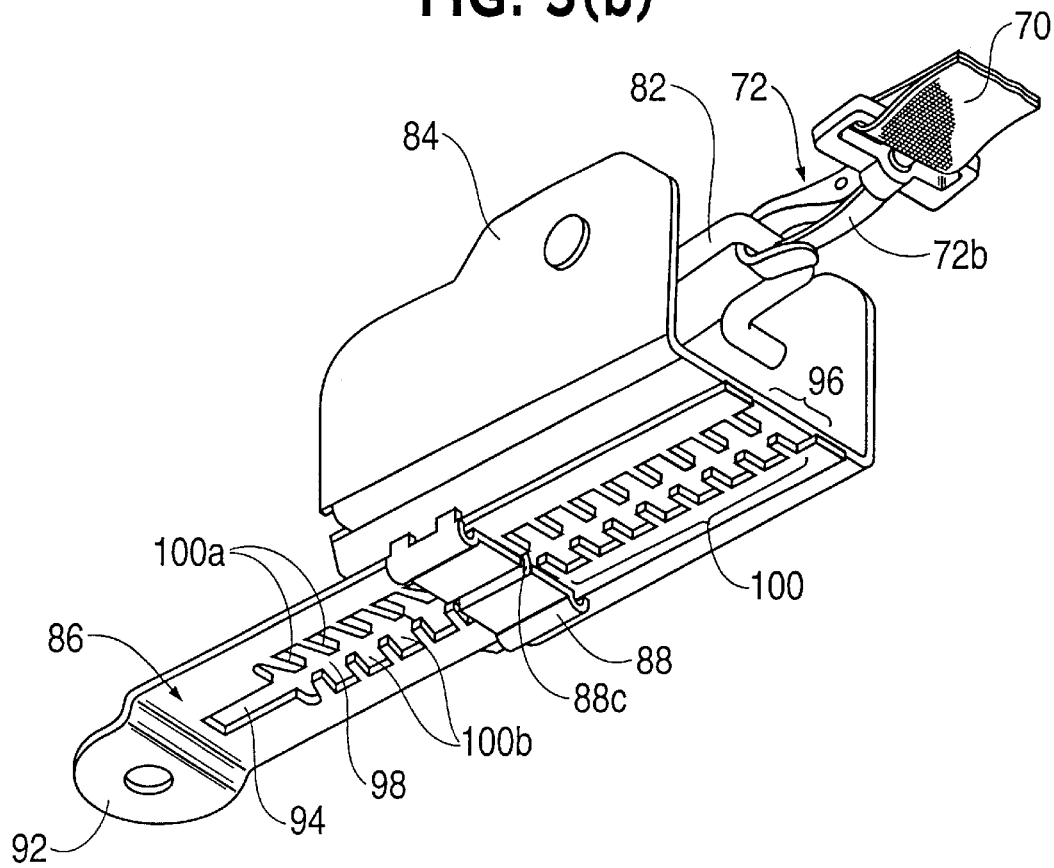

When a significantly large turning force is applied to the upper portion of the child seat 10, in other words, when the connecting member 84 of the energy-absorbing device 80 connected with the tether belt 70 is strongly pulled and a stress in excess of a prescribed value is applied in the forward direction to the projecting portion 88c of the anchor 88 that has been preventing the advancement of the connecting member 84 by being engaged with the engaging hole 94 of the rail section 90, as shown in FIG. 3(b), the projecting portion 88c of the energy-absorbing device 80 digs into the stress absorbing groove 96 and the excess of stress is absorbed by moving forward successively while crushing the projecting strips 100a in the groove 96. The projecting portion 88c moves in the stress absorbing groove 96 according to the magnitude of the stress applied and stops when the stress is decreased to the value below the prescribed value, or when the closed end of stress absorbing groove 96 is reached.

Accordingly, the connecting member 84 unitarily connected to the anchor 88 moves forward along the rail section 90, increasing the effective length of the device, and the child seat 10 moves forward while the turning force applied on the upper portion is being absorbed by the energy-absorbing device apparatus 80, a shock applied by restraining equipment to the person sitting on the seat is significantly reduced.

In this embodiment, though energy-absorbing device 80 comprises the elongated band-shaped rail section 90 having a guide groove 98 extending in the direction away from the seat 50 and comb-shaped portion 100 formed on the left and right edges of the guide groove 98, the energy-absorbing device may have a structure other than the one shown above. It is also possible to have a mechanism similar to the above-described energy-absorbing mechanism provided at the connecting portion between the tether belt 70 and the child seat 10. In this case, the rail section 90 of the base plate and the stress absorbing groove 96 may be omitted so that the connecting member 84 is always fixed firmly to the fixed body such as the rear panel 60.

Figure 4A:
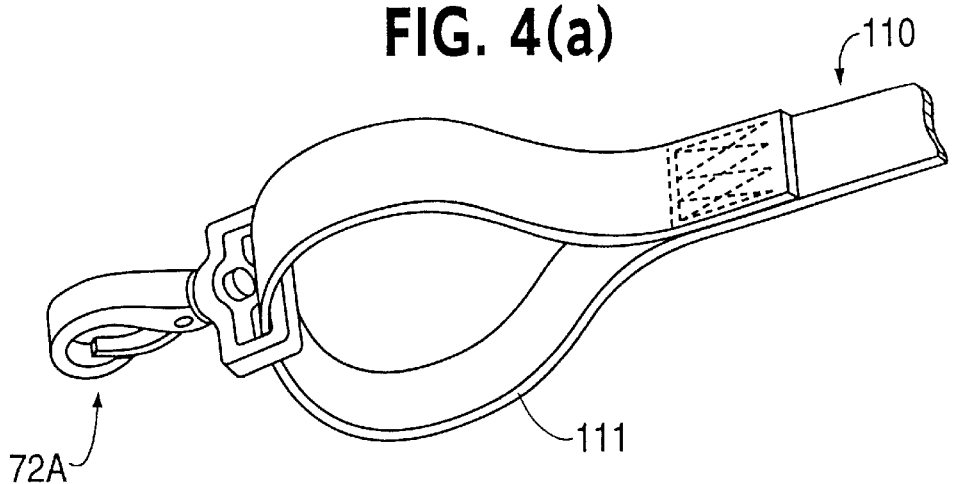
FIGS. 4(a), 4(b) and 4(c) are drawings illustrating an alternative structure in the tether belt form of the child seat restraining apparatus according to a second embodiment.
Figure 4B:
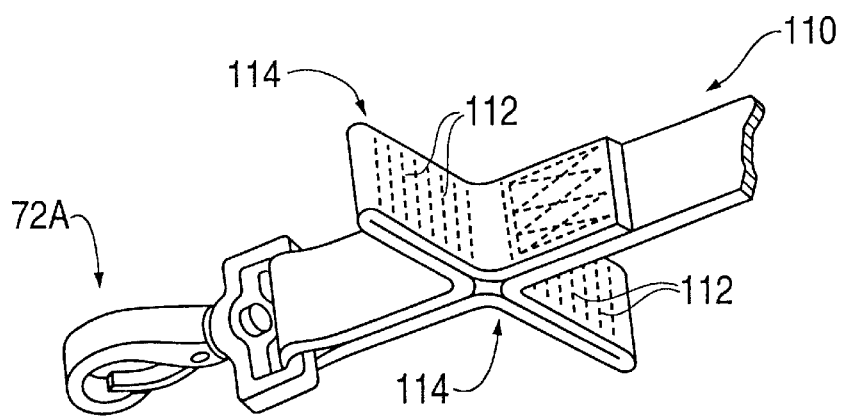
Figure 4C:
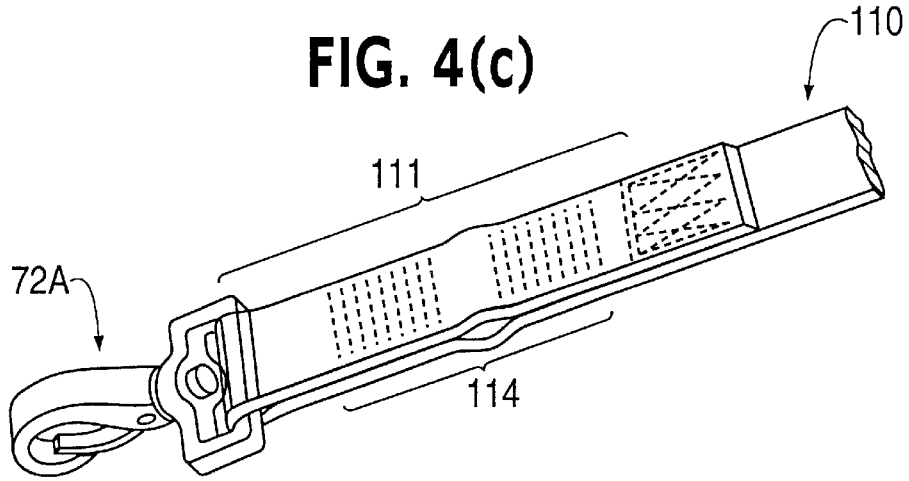

Referring now to FIG. 4, another embodiment of the child seat restraint according to the present invention will be described. FIGS. 4(a)–(c) are perspective views showing the structure of the child seat restraint according to the second embodiment of the present invention.

The child seat restraint comprises a tether belt 110. The tether belt 110 is connected at one end to the upper portion of the child seat as in the case of the tether belt 70 described above. The other end of the tether belt 110 is folded back so that the tip is connected to the midsection of the tether belt to form a looped portion 111 (FIG. 4(a)) with a hook 72A passed through. The hook 72A is the same in structure as the hook 72 described above, and engaged with a hooking bar (corresponding to the bar 82 of the energy-absorbing device 80 described above, not shown) of the child seat restraint.

The looped portion 111 is folded upstream and downstream of the hook 72A so that the length of the tether belt 110 is reduced, and pleated portions 114 are formed by joining the folded mating surfaces by tear seam 112 that is to be torn when subjected to a prescribed tensile strength (FIG. 4(b)), thus forming an energy-absorbing device.

When a tensile strength applied to the tether belt 110 is lower then a prescribed value, tear seam 112 is not torn so that the length of the tether belt 110 is maintained. On the other hand, when a tensile strength in excess of a prescribed value is applied to both ends of the tether belt 110, tear seam 112 is torn to the extent corresponding to the tensile strength applied, and thus a mating along the pleated portion 114 of the tether belt is released by the length corresponding to that of seam torn by the tensile strength so that the overlaid surfaces are separated, thereby increasing the length of the tether belt 110 (FIG. 4(c)).

The hook 72A attached on one end of the tether belt 110 that is connected at the other end to the upper portion of the child seat is engaged with the hooking bar (not shown) of the hook. The hooking bar is attached to a member (fixed body) of the vehicle body such as a rear panel behind the seat. The child seat of which the upper portion is yieldably supported by the child seat restraint is the same type as the child seat 10 described above.

The child seat restraint comprising a tether belt having a structure as described thus far slidably supports the upper portion of the child seat of which the lower portion is fixedly restrained to the seat from behind the seat via the tether belt 110.

When the vehicle encounters a frontal crash, and a turning force in the forward direction is applied to the upper portion of the child seat, the tether belt fixedly connects between the upper portion of the child seat and the rear panel 60 without increasing the length thereof so as to prevent the child seat from turning forward when the turning force applied on the upper portion of the child seat is relatively small and the tensile strength applied to the tether belt 110 is below a prescribed value.

On the other hand, when the turning force applied to the upper portion of the child seat is large and a tensile strength in excess of a prescribed value is applied to the tear belt 110, tear seam 112 of the tether belt 110 is torn at the pleated portion 114, thereby increasing the length of the tether belt 110. Since the child seat moves forward while the turning force is being absorbed by tearing of the tear seam 112, a shock applied to the person sitting on the seat by retraining equipment may be reduced. Lengthening of the tether belt 110 stops when pleated portions 114 are flattened (FIG. 4*c*).

Figure 5:
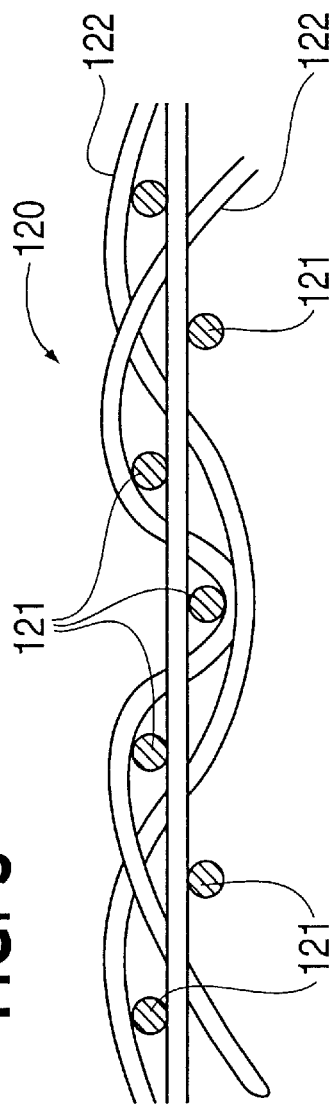
FIG. 5 is an enlarged cross-sectional view showing a weaving structure of a tether belt form of the child seat restraining apparatus according to a third embodiment.
Figure 6:
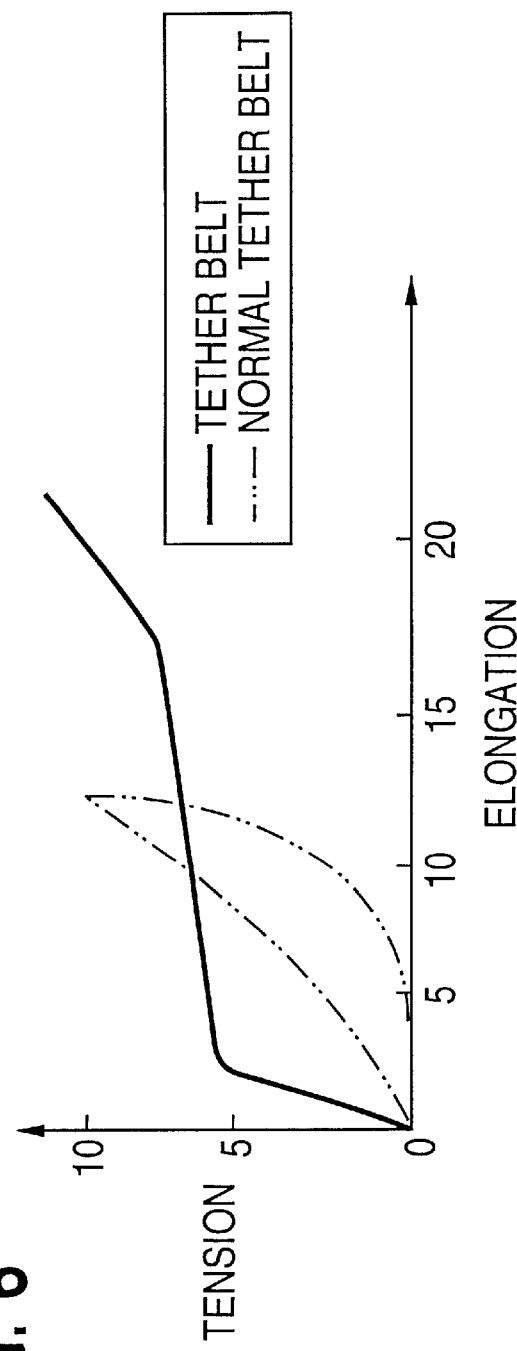
FIG. 6 is a graph illustrating a relation between the tensile strength and elongation of the tether belt shown in FIG. 5.

Referring now to FIGS. 5 and 6, a child seat restraint according to the third embodiment of the present invention will be described. FIG. 5 is a cross-sectional view showing a weaving structure of the tether belt of the child seat restraint according to the third embodiment of the present invention, and FIG. 6 is a graph illustrating the relation between a tensile strength of the tether belt and elongation of the tether belt.

The child seat restraint comprises a tether belt 120 formed of a cloth (webbing) that may be elongated to increase its length while absorbing the stress when a tensile strength in excess of a prescribed value is applied to both ends thereof. The tether belt 120 is formed of webbing in which the number of weft yarns 121 (yarns to be woven in the direction of the width of webbing) is larger than that of webbing used for the normal tether belt and the crimp (length of a foldout) of the warp woven along the peripheries of the weft yarns 121 is increased. Preferably, the number of weft yards are increased by one to six percent over normal belts. Most preferably, the number of weft yards are increased by three percent.

The tether belt 120 formed of webbing of this type is superior in structural elongating characteristic in the longitudinal direction in comparison with the tether belt formed of normal webbing (hereinafter referred to as "normal tether belt"), and thus when both ends thereof are pulled with a tensile strength in excess of a prescribed value, it is elongated more than the normal tether belt while absorbing the stress. (For example, in FIG. 6, the dots dash line represents the relation between the tensile strength and elongation of the normal tether belt).

Though it is not shown, the tether belt 120 is connected to the upper portion of the child seat at one end, and a hook engageable with the hooking bar mounted on the fixed body such as a rear panel of the vehicle body or the like is attached to the other end. The child seat of which the upper portion is yieldably supported by the child seat restraint is the same type as the child seat 10 described above. The child seat yieldable supporting apparatus comprising the tether belt 120 of such a structure yieldably supports the upper portion of the child seat of which the lower portion is fixedly restrained to the seat from behind the seat.

In case this vehicle encounters a frontal crash and a turning force is applied to the upper portion of the child seat in the forward direction, when a tensile strength applied to the tether belt 120 is below a prescribed value, the tether belt 120 anchors the child seat without being elongated and prevents the child seat from turning forward.

On the other hand, when the turning force applied to the upper portion of the child seat is relatively large and a tensile strength in excess of a prescribed value is applied to the tether belt 120, the tether belt 120 elongates while absorbing the stress and increases its length. As a consequence, since the child seat moves forward while a turning force is absorbed in accordance with elongation of the tether belt 120, a shock applied to the person sitting on the seat by restraining equipment reduces.

In this embodiment, while the tether belt 120 is constructed in such a manner that the number of weft yarns 121 is larger than that of webbing used for the normal tether belt, and the crimp of the warp woven along the peripheries of the weft yarns 121 is increased, whereby it is structurally elongated while absorbing a stress to increase its length when a tensile strength in excess of a prescribed value is applied to both ends thereof, it is also possible to increase the rate of elongation by applying heat process to the warp 122 woven in the tether belt 120, so that when a tensile strength in excess of a prescribed value is applied to both ends of the tether belt 120, it elongates while absorbing the stress to increase its length.

In this case, as to the warp 122, when the warp for normal webbing having an elongation rate of about 12% before applying heat treatment, it is desired to apply heat treatment so that the elongation rate is increased to about 40%. The warp 122 that is heat treated to increase elongation rate in this way exhibits a superior elongation characteristic as shown in FIG. 7. FIG. 7 is a graph showing a change of elongation characteristic of the warp 122 caused by heat treatment, and a solid line represents a relation between a tensile strength and elongation of the warp 122 after the heat treatment is applied, and a dot and dash line represents the same relation of the warp 122 before the heat treatment is applied. With this structure, the tether belt 120 has the same effect as the structure described above.

In each embodiment described above, though the child seat restraint is adapted to be mounted on the rear panel as a fixed body behind the rear seat of the vehicle for yieldably supporting the upper portion of the child seat mounted on the seat, the child seat restraint of the present invention is not limited to it but is also applicable as an apparatus for yieldably supporting the child seat to be mounted to any seat of the vehicle, and is applicable to any high-speed mobile body other than the automotive vehicle.

As described above, according to the child seat restraint of the present invention, the upper portion of the child seat is yieldably supported to the fixed body such as a vehicle member to reliably prevents the child seat from being turned forward in case of a frontal crash of the high-speed mobile body, and when a significantly large turning force is applied to the upper portion of the child seat, it absorbs the turning force to reduce a shock applied to the person sitting on the child seat to a significantly low level.

While particular embodiments according to the invention have been illustrated and described above, it will be clear that the invention can take a variety of forms and embodiments within the scope of the appended claims.

What is claimed is:

1. Apparatus for yieldably restraining the upper portion of a child seat having a lower portion and an upper portion mounted in a vehicle near a fixed body portion of the vehicle, comprising:

an extensible energy-absorbing device including a seat-engaging element adapted for attachment to the upper portion of the child seat and operatively connected to a vehicle-engaging element adapted for attachment to the fixed body portion of the vehicle;

wherein the energy absorbing device is adapted to permit an increase in the distance between the upper portion of the child seat and the fixed body portion of the vehicle upon the application of a predetermined stress to the device.

2. Apparatus according to claim 1, wherein the energy-absorbing device is adapted to limit the increase of the distance between the upper portion of the child seat and the fixed body portion of the vehicle upon the application of a predetermined stress to the device.

3. Apparatus according to claim 1, wherein said energy-absorbing device comprises a metallic member that absorbs energy by deformation.

4. Apparatus according to claim 3, wherein the metallic member further comprises a groove with deformable projections.

5. Apparatus according to claim 4, wherein the energy-absorbing device further comprises a deforming member slidably connected to said metallic member and engageable with said deformable projections.

6. Apparatus according to claim 1, wherein the energy-absorbing device comprises a yieldable portion of a tether belt that elongates upon application of a tensile stress in excess of a prescribed value.

7. Apparatus according to claim 6, wherein said yieldable portion comprises at least one tear seam that permits elongation of the tether belt when the tear seam is torn by an applied tensile stress in excess of a prescribed value.

8. Apparatus according to claim 7, wherein said yieldable portion comprises two opposing folded sections of the tether belt, and said tear seam comprises stitching that separately holds said folded sections together.

9. Apparatus according to claim 6, wherein said yieldable portion comprises a greater number of weft yarns and an increased crimp as compared to a normal tether belt.

10. In a vehicle having a body, a vehicle seat mounted to the body, a fixed vehicle body portion located behind the seat, a child seat mounted on the vehicle seat, and a restraint interconnecting the upper portion of the child seat mounted on the vehicle seat, and a restraint interconnecting the upper portion of the child seat and the fixed vehicle body portion, wherein the restraint comprises an extensible energy-absorbing device comprising:

a movable portion comprising a metallic member that absorbs energy by deformation;

and a deforming member slidably connected to said metallic member;

wherein the movable portion moves to permit an increase in the distance between the upper portion of the child seat and the fixed vehicle body portion upon the application of a predetermined stress to the device.

11. Apparatus according to claim 10, wherein the metallic member comprises a groove with deformable projections.

12. In a vehicle having a body, a vehicle seat mounted to the body, a fixed vehicle body portion located behind the seat, a child seat having a lower portion and an upper portion mounted on the vehicle seat, and a restraint interconnecting the upper portion of the child seat and the fixed vehicle body portion, wherein the restraint comprises an extensible energy-absorbing device comprising a yieldable portion that elongates upon application of a tensile stress in excess of a prescribed value, said yieldable portion comprising at least one tear seam that permits elongation of the tether belt when the tear seam is torn by an applied stress in excess of the prescribed value.

13. Apparatus according to claim 12, wherein said yieldable portion comprises two opposing folded sections of the tether belt, and said tear seam comprises stitching that separately holds said folded sections together.

14. In a vehicle having a body, a vehicle seat mounted to the body, a fixed vehicle body portion located behind the seat, a child seat having a lower portion and an upper portion mounted on the vehicle seat, and a restraint interconnecting the upper portion of the child seat and the fixed vehicle body portion, wherein the restraint comprises an extensible energy-absorbing tether belt that elongates upon application of a tensile stress in excess of a prescribed value, the tether belt having a greater number of weft yarns and an increased crimp as compared to a normal tether belt.

15. A restraint for a child seat having a lower portion and an upper portion, the child seat adapted to be mounted on a seat of a vehicle, the restraint adapted to interconnect the upper portion of the child seat to a portion of the vehicle behind the seat, wherein the restraint comprises an extensible energy-absorbing device having a movable portion;

wherein the moveable portion moves to permit an increase in the distance between the upper portion of the child seat and the portion of the vehicle behind the seat upon the application of a predetermined stress to the device.

* * * * *